United States Patent [19]

Khoe et al.

[11] Patent Number: 4,721,353
[45] Date of Patent: Jan. 26, 1988

[54] OPTICAL TRANSMISSION SYSTEM COMPRISING A MONOMODE OPTICAL TRANSMISSION FIBRE HAVING A TAPERED END PORTION

[75] Inventors: Giok D. Khoe; Andreas H. M. Hoovers, both of Eindhoven, Netherlands

[73] Assignee: U.S. Philips Corporation, New York, N.Y.

[21] Appl. No.: 819,574

[22] Filed: Jan. 17, 1986

[30] Foreign Application Priority Data

Oct. 30, 1985 [NL] Netherlands ............... 8502964

[51] Int. Cl.[4] ........................... G02B 6/32
[52] U.S. Cl. ...................... 350/96.18; 350/96.15; 350/96.17; 350/96.20
[58] Field of Search ............ 350/96.10, 96.15, 96.16, 350/96.17, 96.18; 372/19

[56] References Cited

U.S. PATENT DOCUMENTS

| | | | |
|---|---|---|---|
| 3,395,366 | 7/1968 | Snitler | 372/19 |
| 3,686,584 | 8/1972 | Wahl | 372/19 |
| 3,779,628 | 12/1973 | Kapron et al. | 350/96.15 |
| 4,143,940 | 3/1979 | Khoe | 350/96.15 |
| 4,193,663 | 3/1980 | Timmermann | 350/96.18 |
| 4,243,296 | 1/1981 | Aulich et al. | 350/96.15 |
| 4,370,021 | 1/1983 | Khoe et al. | 350/96.18 |
| 4,415,227 | 11/1983 | Unger | 350/96.15 |
| 4,500,996 | 2/1985 | Sasnett et al. | 372/19 |

FOREIGN PATENT DOCUMENTS

| | | | |
|---|---|---|---|
| 0114439 | 1/1984 | European Pat. Off. | 350/96.18 |
| 54-2758 | 1/1979 | Japan | 350/96.18 |
| 57-198424 | 12/1982 | Japan | 350/96.15 |
| 60-88909 | 5/1985 | Japan | 350/96.17 |
| 7811279 | 5/1980 | Netherlands | 350/96.18 |

*Primary Examiner*—William L. Sikes
*Assistant Examiner*—Brian M. Healy
*Attorney, Agent, or Firm*—Marc D. Schechter

[57] ABSTRACT

An optical transmission system comprises a monomode optical transmission fibre which has an end portion in which the diameter of the core tapers toward the end. If the tapered portion is followed by a part of increasing diameter this results in a better matching to the wavefront which issues from the lens arranged in front of or on the fibre. This yields a higher coupling efficiency.

8 Claims, 4 Drawing Figures

OPTICAL TRANSMISSION SYSTEM COMPRISING A MONOMODE OPTICAL TRANSMISSION FIBRE HAVING A TAPERED END PORTION

BACKGROUND OF THE INVENTION

The invention relates to an optical transmission system comprising a radiation source, a monomode optical transmission fibre having an end portion in which the core diameter varies, and a lens system interposed between the radiation source and the transmission fibre.

A transmission fibre having an end portion in which the core diameter varies is disclosed in European Patent Application No. 0,114,439. Said application describes a monomode optical transmission fibre whose end portion has a tapered core and cladding. The end of the fibre carries a spherical lens of a material having a refractive index which is substantially higher than the refractive index of the core material of the fibre.

A transmission fibre having a tapered core and cladding has suitable properties with respect to the permissible offset of the fibre relative to the radiation source, for example, a diode laser, and the feedback of radiation to the radiation source as a result of reflections within the fibre. Such a fibre has a comparatively high coupling efficiency. The coupling efficiency is that fraction of the radiation emitted by the radiation source which is transmitted in the fibre. The presence of a lens on the tapered end portion of the fibre, for example, a lens having a high refractive index and consequently a large numerical aperture, leads to a further increase in coupling efficiency.

It may be desirable to increase the coupling efficiency even further because this enables the number of intermediate amplifiers in a long-distance transmission line to be reduced or because it enables weaker radiation sources, for example light-emitting diodes, to be used, which diodes are of a simpler construction and consequently cheaper. It has been found that a part of the residual coupling loss is due to a suboptimum matching of the wavefront issuing from the lens to the wavefront entering the fibre.

SUMMARY OF THE INVENTION

It is the object of the invention to improve this matching. To this end an optical transmission system in accordance with the invention is characterized in that toward the lens the core diameter of the transmission fibre decreases to a smallest value from which it increases to a largest value smaller than the diameter in the straight portion of the fibre.

The funnel-shaped end portion of the optical transmission fibre accepts a wavefront whose shape is substantially identical to that of the wavefront issuing from the lens system. The transmission fibre may be provided with a tapered end portion having a funnel-shaped part by means of a method which does not essentially differ from that for forming the fibre with a conventional tapered end portion, for example, as described in said European Patent Application No. 0,114,439.

It is to be noted that it is known per se from U.S. Pat. No. 3,779,628 to provide an optical transmission fibre with a funnel-shaped end portion in order to increase the coupling efficiency. However, the funnel-shaped portion described therein serves to receive an incident radiation beam of a diameter which is larger than the core diameter of the fibre. In contradistinction to the end portion of the fibre in accordance with present invention, in the funnel-shaped end portion of the transmission fibre described in said U.S. Pat. No. 3,779,628 the core and cladding diameters at the broad side are required to be larger than the core and cladding diameters in the straight part of the transmission fibre.

An embodiment of the invention is characterized in that in the end portion of the fibre the distance between the largest-diameter plane at the end face of the fibre and the smallest-diameter plane is not larger than the distance between the smallest-diameter plane and the straight part of the fibre. The length of the funnel-shaped end portion and the largest diameter should be adapted to suit the shape of the wavefront to be received. This shape depends on the radiation source and the lens system. For known radiation sources the length of the funnel-shaped portion is not larger than the length of the tapered portion of the fibre.

A preferred embodiment of the invention is characterized in that a lens is arranged on the end face of the transmission fibre. This lens may be arranged in a manner as described in said European Patent Application No. 0,114,439.

A further embodiment of the invention is characterized in that the end face of the transmission fibre is flat.

BRIEF DESCRIPTION OF THE DRAWING

Embodiments of the invention will now be described in more detail, by way of example, with reference to the accompanying drawings, in which.

DESCRIPTION OF THE PREFERRED EMBODIMENTS

Figure 1A:
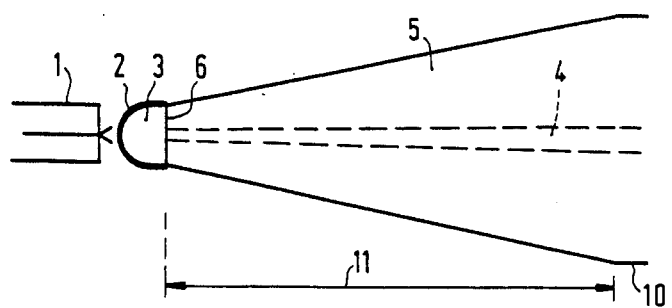
FIG. 1a shows a known monomode optical transmission fibre with a tapered end portion and a lens, FIG. 1b schematically shows the shape of the wavefront therein, and FIG. 2a schematically shows the shape of the wavefront for an optical transmission fibre in accordance with the invention.

In FIG. 1a a light source, for example, a semiconductor-diode laser, is designated 1. A part of the beam emitted by the source is received by the lens 3. The lens 3 is made of, for example, a material whose refractive index is substantially higher than the refractive index of the material of the core 4 of the optical transmission fibre 10.

Possible values for the refractive indices are for example, 1.9 for the lens 3 and 1.5 for the core material. The cladding 5 is made of a material having a refractive index which is, for example, 0.3% smaller than that of the core material.

The optical transmission fibre 10 is provided with an end portion 11 where the core and cladding are tapered, for example, in a manner as described in European Patent Application No. 0,114,439. At the location of the plane 6 the end portion 11 adjoins the lens 3. This lens may be provided with an antireflection coating 2.

Figure 1B:
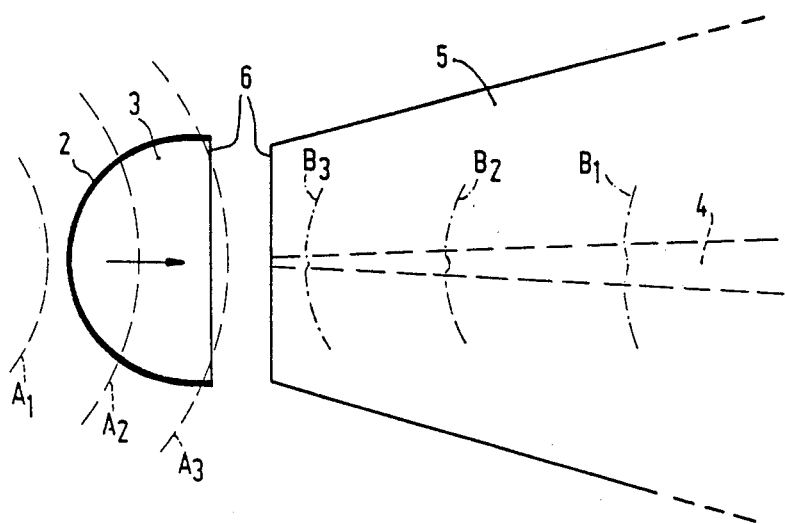

For the sake of clarity the lens 3 is not shown positioned against the end face of the fibre 10 in FIG. 1b. The dashed curves $A_1$, $A_2$, $A_3$ represent the wavefront of the radiation emitted by the radiation source 1 at different locations. The dash-dot curves $B_1$, $B_2$, $B_3$ represent the shape of the wavefront at different locations if radiation should emerge from the fibre. It is evident that this wavefront has a different shape than the wavefront traversing the lens.

Figure 2A:
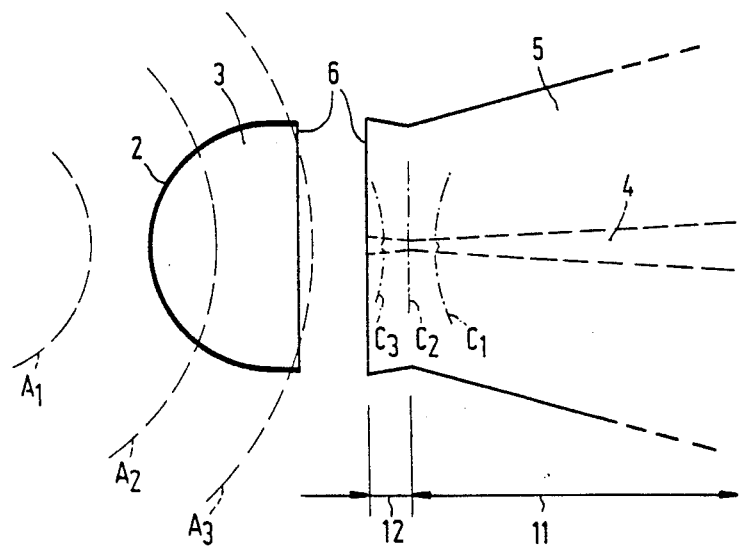
FIG. 2b shows an optical transmission system in accordance with the invention.

FIG. 2a schematically shows a part of a transmission system in accordance with the invention. Between the end face 6 and the tapered portion 11 of the fiber 10 a funnel-shaped part 12 is located. Viewed from the fibre 10 the diameters of the core and cladding of part 12 increase toward the end face 6. The part 12 ensures that at the location of the end face 6 the wavefront $C_3$ of radiation issuing from the fibre has the same shape as the wavefront $A_3$ issuing from the lens. This wavefront is inverted in comparison with the wavefront $B_3$ in FIG. 1b.

Figure 2B:
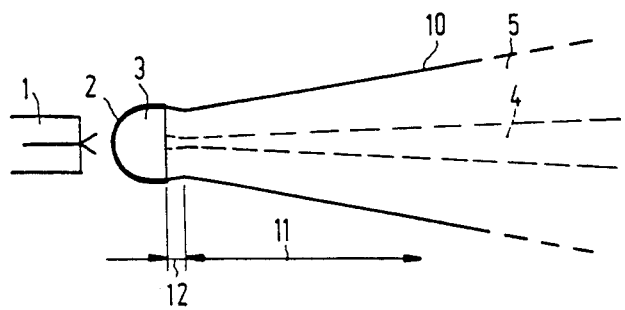

FIG. 2b shows an optical transmission system in accordance with the invention. Identical reference numerals denote the same elements as shown in FIGS. 1a, 1b and 2a. Therefore, this Figure requires no further explanation.

Apart from a lens having a comparatively high refractive index said lens 3 in the Figures may alternatively be a lens whose refractive index is comparable to that of the core material. When the lens is fused on, care must be taken that the fiber material is not softened. Therefore, the melting temperature of the lens material should be distinctly lower than the melting temperature of the fibre materials.

A transmission fibre in accordance with the invention may be, for example, a monomode optical fibre having a cladding diameter of 125 μm and a core diameter of 7 μm. The smallest diameter is 13 μm, the diameter at the end face is approximately 35 μm and the length of the funnel-shaped part is for example 50 μm.

The coupling efficiency of a realized optical transmission system of the type shown in FIG. 2b is 70%, while in systems without the funnel-shaped part 12 a maximum efficiency of approximately 60% is attainable. This means that the efficiency loss is reduced by approximately 25%.

What is claimed is:

1. An optical transmission system comprising a radiation source, a monomode optical transmission fibre having an end portion in which the core diameter varies, and a lens system interposed between the radiation source and the transmission fibre, characterized in that toward the lens the diameter of the core of the transmission fibre decreases to a smallest diameter from which it increases to a largest diameter which is smaller than the diameter in the straight portion of the fibre.

2. An optical transmission system as claimed in claim 1, characterized in that in the end portion of the fibre the distance between the largest-diameter plane at the end face of the fibre and the smallest-diameter plane is not larger than the distance between the smallest-diameter plane and the straight part of the fibre.

3. An optical transmission system as claimed in claim 1 or 2, characterized in that a lens is arranged on the end face of the transmission fibre.

4. An optical transmission system as claimed in claim 3, charaterized in that the end face of the transmission fibre is flat.

5. An optical transmission system comprising:
   a radiation source;
   a monomode optical transmission fiber having a core and a cladding, said core having a diameter, said fiber having a straight portion in which the core diameter is substantially constant, said fiber having an end portion in which the core diameter varies, said end portion having a free end with an end face, the core diameter at the end face being less than the core diameter at the straight portion, the core diameter in the end portion decreasing from the end face to a place of smaller core diameter; and
   a lens arranged between the radiation source and the transmission fiber.

6. An optical transmission system as claimed in claim 5, characterized in that the core diameter in the end portion increases from the place of smaller core diameter to the straight portion of the fiber.

7. An optical coupler comprising:
   a monomode optical transmission fiber having a core and a cladding, said core having a diameter, said fiber having a straight portion in which the core diameter is substantially constant, said fiber having an end portion in which the core diameter varies, said end portion having a free end with an end face, the core diameter at the end face being less than the core diameter at the straight portion, the core diameter in the end portion decreasing from the end face to a place of smaller core diameter; and
   a lens arranged in front of the end face of the transmission fiber.

8. An optical coupler as claimed in claim 7, characterized in that the core diameter in the end portion increases from the place of smaller core diameter to the straight portion of the fiber.

* * * * *